United States Patent
Sakai

(10) Patent No.: US 9,857,627 B2
(45) Date of Patent: Jan. 2, 2018

(54) LIQUID CRYSTAL DISPLAY DEVICE

(71) Applicant: Japan Display Inc., Tokyo (JP)

(72) Inventor: Takeshi Sakai, Tokyo (JP)

(73) Assignee: Japan Display Inc., Tokyo (JP)

( * ) Notice: Subject to any disclaimer, the term of this patent is extended or adjusted under 35 U.S.C. 154(b) by 107 days.

(21) Appl. No.: 14/930,261

(22) Filed: Nov. 2, 2015

(65) Prior Publication Data

US 2016/0131955 A1   May 12, 2016

(30) Foreign Application Priority Data

Nov. 12, 2014 (JP) ................. 2014-229722

(51) Int. Cl.
*G02F 1/1335* (2006.01)
*G02F 1/1343* (2006.01)
*G02F 1/1362* (2006.01)
*G02B 6/00* (2006.01)

(52) U.S. Cl.
CPC ......... *G02F 1/133553* (2013.01); *G02B 6/00* (2013.01); *G02F 1/1362* (2013.01); *G02F 1/134363* (2013.01)

(58) Field of Classification Search
CPC ................. G02F 1/133553; G02F 2001/13606
See application file for complete search history.

(56) References Cited

U.S. PATENT DOCUMENTS 9,575,353 B2 *   2/2017   Jang ................. G02F 1/136209
2011/0255028 A1   10/2011   Nishizawa
2015/0198845 A1 *   7/2015   Lee ................... G02F 1/133528
                                                349/46

FOREIGN PATENT DOCUMENTS

JP        2011-227191 A     11/2011

* cited by examiner

*Primary Examiner* — Timothy L Rude

(74) *Attorney, Agent, or Firm* — Typha IP LLC

(57) ABSTRACT

A provided is a liquid crystal display device for reducing power consumption by increasing efficiency of a backlight. The liquid crystal display includes, on a TFT substrate, a semiconductor layer and a gate electrode are laminated via a gate insulating film. A TFT is formed by the semiconductor layer and the gate electrode. A base film is formed of an insulating film and at a lower layer of the semiconductor layer. As seen in plan view, a reflection film is formed on a lower side of the base film at an area corresponding to the TFT. The reflection film is independently formed for each of the TFTs. Each of the reflection films is electrically floating. The reflection film has a reflectance of 70% or more at a lower side thereof. The use efficiency of the light from a backlight can be increased because of the existence of the reflection film.

11 Claims, 12 Drawing Sheets

| MATERIAL OF INCIDENT PLANE | BRIGHTNESS INCREASE RATE |
|---|---|
| BLACK MATRIX (REFLECTANCE: 5%) | STANDARD 1.0 |
| Ti (REFLECTANCE: 54.6%) | 1.39 |
| MoW (REFLECTANCE: 60%) | 1.41 |
| AℓSi (REFLECTANCE: 86.2%) | 1.51 |

C-C

LIQUID CRYSTAL DISPLAY DEVICE

CLAIM OF PRIORITY

The present application claims priority from Japanese Patent Application JP 2014-229722 filed on Nov. 12, 2014, the content of which is hereby incorporated by reference into this application.

BACKGROUND OF THE INVENTION

1. Field of the Invention

The present invention relates to a liquid crystal display device, and more particularly to a liquid crystal display device having a high-definition screen.

2. Description of the Related Art

A liquid crystal display device as a kind of display device includes: a TFT substrate where pixels including pixel electrodes, thin film transistors (TFTs) and the like are arranged in a matrix form; a counter substrate opposed to the TFT substrate; and liquid crystal sandwiched between the TFT substrate and the counter substrate. The display device forms an image by controlling transmittance of light through the liquid crystal molecules on a per-pixel basis.

The liquid crystal display device requires backlight because the liquid crystal per se does not emit light. Because of the increasing usage pattern as a portable device, the liquid crystal display devices of medium/small sizes are faced with the need for reduction of power consumption. In the pursuit of the reduction of power consumption through more efficient use of light from the backlight, Japanese Unexamined Patent Application Publication No. 2011-227191 discloses a structure where the TFT substrate is formed with a reflection layer at a region except for a light transmission region such that the power consumption of the backlight is reduced by reutilizing the light from this reflection layer (Japanese Unexamined Patent Application Publication No. 2011-227191).

The medium/small sized liquid crystal display devices have a high-definition screen. As the liquid crystal display device has the higher definition, a liquid crystal display panel has the lower aperture ratio. Therefore, the use efficiency of light from the backlight decreases with the increase in the screen resolution. In other words, the display device is increased in the power consumption of the backlight to keep the same brightness as before.

The technique disclosed in the cited literature 1 suggests the structure where the reflection film such as of metal is applied to the overall TFT substrate except for the apertures so as to reutilize the light from the backlight. However, this structure adversely affects signal writing speed and the like because a substantial capacitance is formed between the reflection film and image signal lines or scanning lines.

SUMMARY OF THE INVENTION

An object of the invention is to provide a liquid crystal display device which is adapted to increase the use efficiency of light from the backlight and to suppress the increase in stray capacitance so as to prevent problems such as delay in signal writing.

The invention aims to address the above problem and principally features the following specific means.

(1) A liquid crystal display device includes: a TFT substrate which includes scanning lines extended in a first direction and arranged in a second direction, image signal lines extended in the second direction and arranged in the first direction, and pixel electrodes formed between the scanning lines and the image signal lines; a counter substrate; and liquid crystal sandwiched between the TFT substrate and the counter substrate, and has a structure wherein a semiconductor layer and a gate electrode are laminated via a gate insulating film and a TFT is formed by the semiconductor layer and the gate electrode; a base film is formed of an insulating film at an under layer of the semiconductor layer and as seen in plan view, a reflection film is formed on a lower side of the base film at an area corresponding to the TFT; the reflection film is independently formed for each of the TFTs and each reflection film is electrically floating; and the reflection film has a reflectance of 70% or more at the lower side thereof.

(2) The liquid crystal display device according to the aspect (1) has a structure wherein as seen in plan view, the reflection films are also formed at a lower layer of the scanning line and a lower layer of the image signal line; the reflection films formed at the lower layer of the scanning line and the lower layer of the image signal line are divided for each of the pixels; and the divided reflection films are electrically floating.

(3) The liquid crystal display device according to the aspect (1) or (2) has a structure wherein the scanning line or the image signal line has a reflectance of 70% or more at a lower surface thereof.

(4) The liquid crystal display device according to any one of the aspects (1) to (3) has a structure wherein the reflection film is formed of an Al alloy.

(5) The liquid crystal display device according to the aspect (4) has a structure wherein the Al alloy is AlSi.

(6) The liquid crystal display device according to any one of the aspects (1) to (5) has a structure wherein the reflection film is formed of a plurality of layers, the lowest one of which is formed of an Al alloy.

(7) The liquid crystal display device according to the aspect (3) has a structure wherein the scanning line or the image signal line is formed of a plurality of layers, the lowest one of which is formed of an Al alloy.

(8) The liquid crystal display device according to the aspect (3) has a structure wherein the image signal line is formed of a plurality of layers, the lowest one of which is formed of an Al alloy, and an area where the image signal line is in contact with the semiconductor layer is free from the Al alloy.

BRIEF DESCRIPTION OF THE DRAWINGS

FIG. 9 is a table showing a relation between the reflectance of the reflection film and the brightness increase;

DETAILED DESCRIPTION OF THE PREFERRED EMBODIMENTS

The invention will be described in detail as below with reference to the embodiments thereof.

First Embodiment

Figure 2:
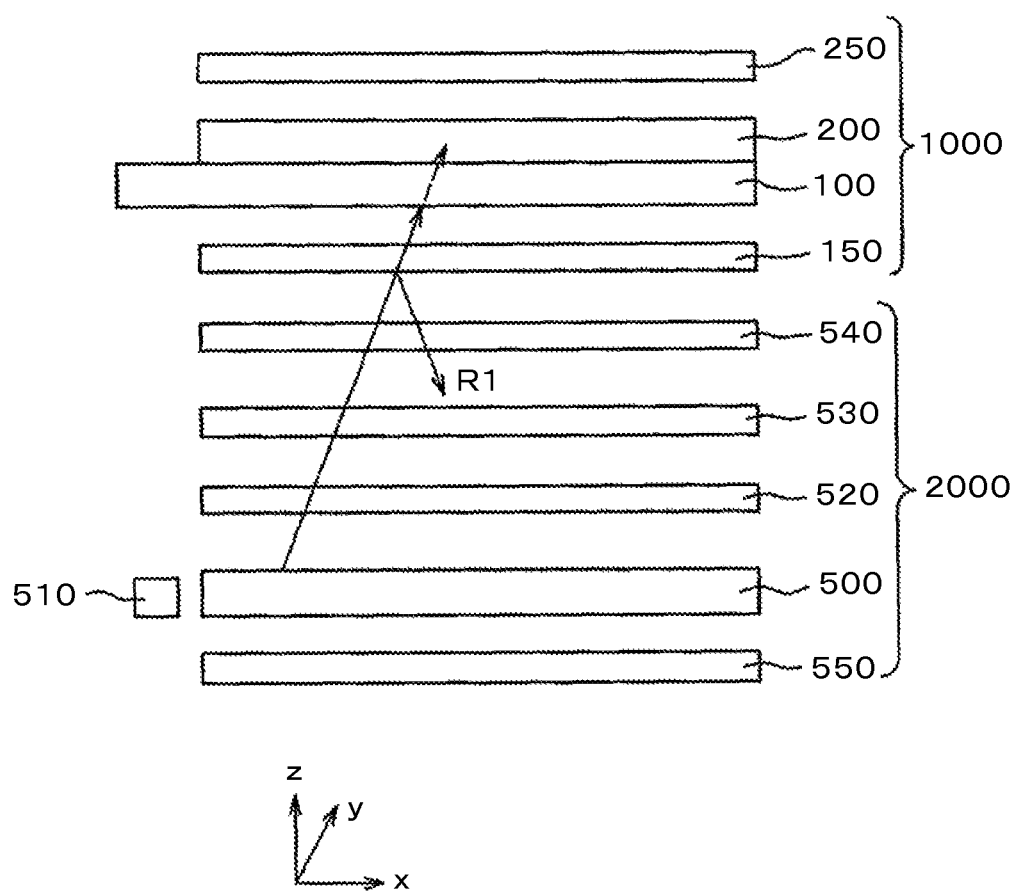
FIG. 2 is an exploded sectional view showing a liquid crystal display panel and a backlight in the case of use of a reflection polarizer plate.

FIG. 2 is an exploded sectional view of a liquid crystal display device. Referring to FIG. 2, a counter substrate 200 is attached to a TFT substrate 100 with a sealing material applied to peripheries thereof while liquid crystal is sandwiched between the TFT substrate 100 and the counter substrate 200. A lower polarizer plate 150 is attached to a lower side of the TFT substrate 100. An upper polarizer plate 250 is attached to an upper side of the counter substrate 200. The TFT substrate 100, counter substrate 200, lower polarizer plate 150 and upper polarizer plate 250 are collectively referred to as a liquid crystal display panel 1000.

A backlight 2000 is disposed under the lower polarizer plate 150 of the liquid crystal display panel 1000. The backlight 2000 has structure where a light source 510 is disposed laterally of a light guide plate 500 which guides light from the light source 500 toward the liquid crystal display panel 1000. A diffuser sheet 520 is disposed on the light guide plate 500. The diffuser sheet 520 functions to reduce the brightness unevenness of light transmitted from the light guide plate 500 to the liquid crystal display panel 1000. Disposed on the diffuser sheet 520 is a lower prism sheet 530, on which an upper prism sheet 540 is disposed.

The lower prism sheet 530 is formed with linear prisms in a direction of x-axis in FIG. 2 at a pitch on the order of 50 μm, for example. The upper prism sheet 540 is formed with linear prisms in a direction of y-axis in FIG. 2 at a pitch on the order of 50 μm, for example. Both the upper prism sheet 540 and the lower prism sheet 530 function to increase the efficiency of the backlight 2000 by directing light deviated from a normal direction of the liquid crystal display panel 1000 in the normal direction of the liquid crystal display panel 1000. The liquid crystal display panel is disposed on the upper prism sheet 540. Sometimes, interposed between the upper prism sheet 540 and the liquid crystal display panel 1000 is an upper diffuser sheet, which is not shown in FIG. 1.

Referring to FIG. 2, the lower polarizer plate 150 employs a reflection polarizer plate. The liquid crystal can control only polarized light. Hence, the liquid crystal transmits only linearly polarized light therethrough but not light vibrating in the same direction as an absorption axis of the lower polarizer plate 150. The reflection polarizer plate 150 can increase the use efficiency of light from the backlight 2000 by reflecting the light vibrating in the same direction as the absorption axis so as to change the phase of the reflected light in the backlight 2000 and to make the light incident on the reflection polarizer plate 150 again and transmitted through the reflection polarizer plate 150. As shown in FIG. 2, on the other hand, of the light transmitted through the lower polarizer plate 150, rays incident on a non-aperture part such as wirings on the TFT substrate 100 cannot be used. FIG. 2 indicates that a light ray incident on the TFT substrate 100 as represented by a dotted line is absorbed by a light shielding film and the like of the TFT substrate 100.

Figure 1:
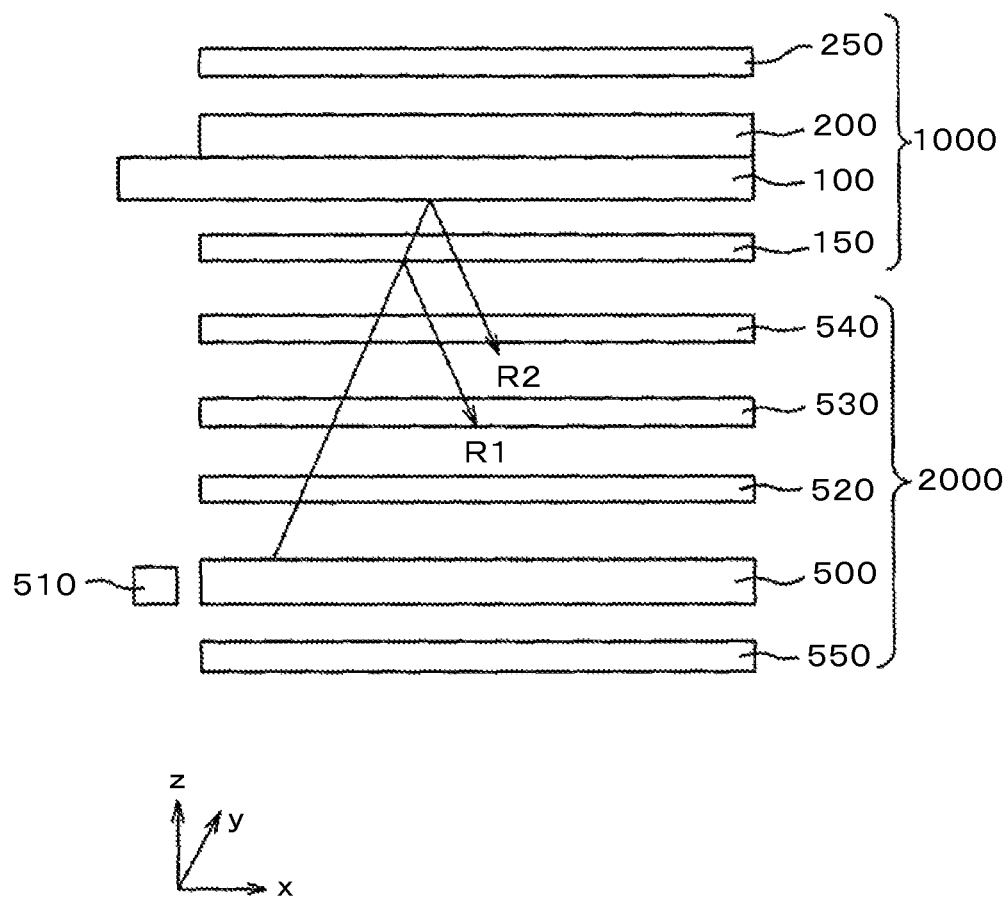
FIG. 1 is an exploded sectional view of a liquid crystal display panel and a backlight for illustrating an operation of the invention.

FIG. 1 is a sectional view of the liquid crystal display device showing a feature of the invention. The figure differs from FIG. 2 in that a lower surface of the light shielding film or the wirings of the TFT substrate 100 forms a reflection plane such that a light incident on a non-transmission area of the TFT substrate 100 is reflected back to the backlight 2000 so as to be reflected again from the backlight 2000 and used for image formation. In FIG. 1, a light ray R2 represents the light reflected from the lower surface of the TFT substrate 100. R1 in FIG. 1 represents the light reflected from the reflection polarizer plate 150.

Figure 3:
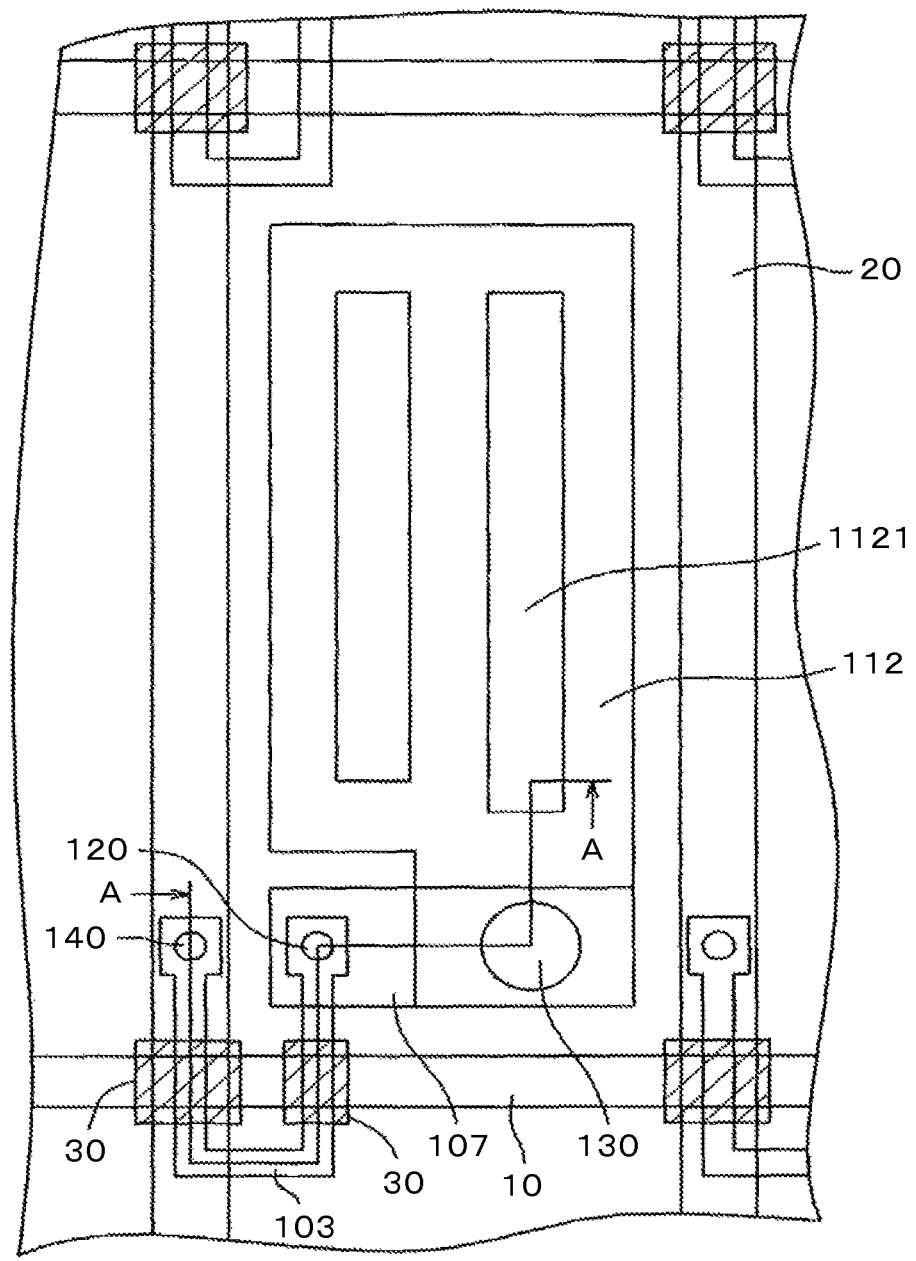
FIG. 3 is a plan view showing a first embodiment of the invention.

FIG. 3 is a plan view of a pixel part according to the first embodiment. FIG. 3 is a plan view showing a pixel configuration of a so-called IPS (In Plane Switching)/FFS (Fringe Field Switching) system. Referring to FIG. 3, scanning lines 10 are extended in a horizontal direction and arranged in a vertical direction. Image signal lines 20 are extended in the vertical direction and arranged in the horizontal direction. A pixel electrode 112 is formed in a region enclosed by the scanning lines 10 and the image signal lines 20.

Referring to FIG. 3, a semiconductor layer 103 is configured to extend from a through-hole 140 in a U-shape so as to pass under the scanning line 10 twice. An area where the semiconductor layer 103 passes under the scanning line 10 defines a TFT. At this area, the scanning line 10 serves as a gate electrode. The semiconductor layer 103 is in contact with a contact electrode 107 via a through-hole 120. The contact electrode 107 is in contact with the pixel electrode 112 via a through-hole 130. The pixel electrode 112 is a comb-shaped electrode with slits 1121 formed inside.

The area where the semiconductor layer 103 passes under the scanning line 10 defines a channel part of the TFT. Light emitted from the backlight and falling on this area induces photoelectric current, which disables holding of an image signal. Therefore, the light shielding film is formed on this area so as to shield the semiconductor layer 103 from the light. The feature of this embodiment is to increase the use efficiency of light by defining this light shielding film by a reflection film 30 formed of a metal having a high reflectance. That is, the reflection film 30 reflects back the light from the backlight to the backlight, from which the reflected light is made incident onto the liquid crystal display panel again and transmitted through a transmission area anew.

Figure 4:
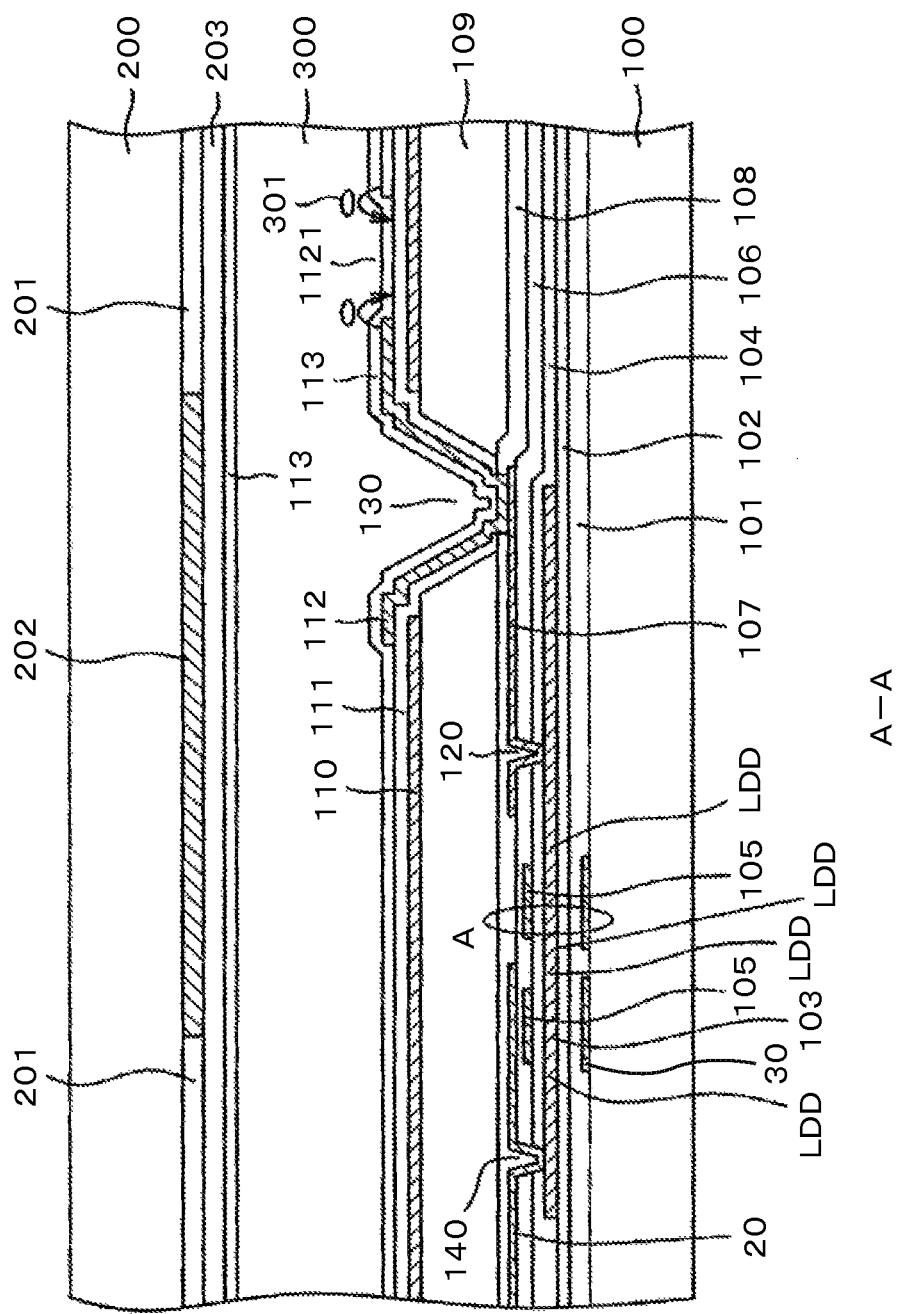
FIG. 4 is a sectional view taken on the line A-A in FIG. 3.

FIG. 4 is a sectional view taken on the line A-A in FIG. 3. The TFT shown in FIG. 4 is a so-called top-gate type TFT, which employs LTPS (Low Temperature Poli-Si) semiconductor. Referring to FIG. 4, a first base film 101 of SiN and a second base film 102 of $SiO_2$ are formed on a glass substrate 100 by CVD (Chemical Vapor Deposition). The first base film 101 and the second base film 102 function to protect the semiconductor layer 103 from contamination with impurities from the glass substrate 100.

The semiconductor layer 103 is formed on the second base film 102. This semiconductor layer 103 is formed by the steps of forming an a-Si film on the second base film 102 by CVD and converting the a-Si film to a poly-Si film by laser annealing. This poly-Si film is photolithographically patterned.

A gate insulating film 104 is formed on the semiconductor film 103. This gate insulating film 104 is a $SiO_2$ film using TEOS (tetraethoxysilane). This film is formed by CVD, too. Formed on this film is a gate electrode 105. The scanning line 10 shown in FIG. 3 doubles as the gate electrode 105. Since the semiconductor layer passes under the scanning line 10 twice, two gate electrodes 105 are shown in FIG. 4. The gate electrode 105 is formed of a MoW film, for example.

The gate electrode 105 is photolithographically patterned. In this patterning process, a source S or drain D is formed at the poly-Si layer by doping the poly-Si layer with impurities such as phosphor or boron by ion implantation. Further, a photoresist used in the patterning of the gate electrode 105 is utilized to form an LDD (Lightly Doped Drain) layer between a channel layer of the poly-Si layer and the source S or the drain D thereof. The LDD layer is for prevention of local increase of field strength.

Subsequently, a first interlayer insulating film 106 is formed of $SiO_2$ over the gate electrode 105. The first interlayer insulating film 106 is for insulation between the gate electrode 105 and the contact electrode 107. The interlayer insulating film 106 and the gate insulating film 104 are formed with the through-hole 120 for connecting the semiconductor layer 103 to the contact electrode 107. The lithography process for forming the through-holes 120 in the first interlayer insulating film 106 and in the gate insulating film 104 is performed at a time.

The image signal lines are formed on the first interlayer insulating film 106. The image signal line is connected to the semiconductor layer via the through-hole 140. Namely, two TFTs are formed between the through-hole 140 and the through-hole 120. On the first interlayer insulating film 106, the contract electrode 107 and the image signal line 20 are formed at the same layer. The contact electrode 107 is connected to the pixel electrode 112 via the through-hole 130. The image signal line and the contact electrode are formed of MoW, for example.

An inorganic passivation film 108 is formed of SiN or the like over the image signal lines 20 and the contact electrodes 107 so as to protect the entire TFT. The inorganic passivation film 108 is formed by CVD similarly to the first base film 101. An organic passivation film 109 is formed over the inorganic passivation film 108. The organic passivation film 109 is formed of a photosensitive acrylic resin. The organic passivation film 109 can also be formed of another resin than the acrylic resin, such as silicone resin, epoxy resin or polyimide resin. The organic passivation film 109 is formed thick because it has a role as a flattening film. The organic passivation film 109 has a film thickness in the range of 1 to 4 μm, normally on the order of 2 μm.

The through-hole 130 is formed through the inorganic passivation film 108 and the organic passivation film 109 in order to provide electric connection between the pixel electrode 110 and the contact electrode 107. The organic passivation film 109 employs a photosensitive resin. When the photosensitive resin is exposed to light after the application thereof, only an exposed portion of the resin is dissolved in a particular developing liquid. Namely, the use of the photosensitive resin negates the need for the formation of the photoresist. After forming the through-hole 130 through the organic passivation film 109, the organic passivation film 109 is completed by firing the organic passivation film 109 at temperatures on the order of 230° C.

Subsequently, ITO (Indium Tin Oxide) forming a common electrode 110 is formed by spattering, followed by patterning to remove ITO from the through-hole 130 and its periphery. The common electrode 110 can be formed in a planar shape so as to be shared by the pixels. Subsequently, SiN forming a second interlayer insulating film 111 is formed on the overall surface by CVD. Subsequently, in the through-hole 130, a through-hole for providing electric connection between the contact electrode 107 and the pixel electrode 112 is formed through the second interlayer insulating film 111 and the inorganic passivation film 108.

Subsequently, ITO is formed by spattering and patterned to form the pixel electrode 112. A planar shape of the pixel electrode 112 is shown in FIG. 3. An alignment film 113 is formed by applying an alignment film material onto the pixel electrode 112 by flexography or ink jet printing, followed by firing. A rubbing method or optical alignment using a polarized ultraviolet ray is used for alignment processing of the alignment film 113.

A voltage applied between the pixel electrode 112 and the common electrode 110 induces a line of electric force as shown in FIG. 4. An image is formed by rotating liquid crystal molecules with this electric field so as to control the quantity of light transmitted through a liquid crystal layer 300 on a per-pixel basis.

Referring to FIG. 4, a counter substrate 200 is disposed on the other side across the liquid crystal layer 300. The counter substrate 200 is formed with a color filter 201 on an inner side thereof. The color filter 201 is formed with red, green and blue color filters on a per-pixel basis and a color image is formed through these color filters. A black matrix 202 is formed between the color filter 201 and the color filter 201 such as to enhance image contrast. It is noted that the black matrix 202 also functions as the light shielding film for TFT, preventing the flow of photoelectric current into the TFT.

An overcoat film 203 is formed over the color filter 201 and the black matrix 202. The color filter 201 and the black matrix 202 have uneven surfaces, which are flattened by the overcoat film 203. Formed on the overcoat film is the alignment film 113 for deciding the initial alignment of the liquid crystal. Similarly to the alignment of the alignment film 113 on the TFT substrate 100, the rubbing method or optical alignment method is used for the alignment processing of the alignment film 113.

The feature of the invention consists in that the reflection film 30 is formed on the lower side of the first base film 101 such as to reflect back the light from the backlight incident on this area to the backlight. Heretofore, the light shielding film is formed at this area. This is to prevent the light from the backlight from becoming incident on the semiconductor layer 103 at this area. In the prior art, the light incident on the light shielding film is absorbed by the light shielding film and thence, makes no contribution to the image formation. The feature of the invention consists in that this light shielding film is formed of a metal having a high reflectance such as AlSi so that the light from the backlight is reflected back to the backlight, from which the returned light is reflected again and used for the light for image formation.

Referring to FIG. 3 and FIG. 4, the reflection film 30 is formed to have a width slightly greater than that of the image signal line 20 or the scanning line 10. However, the width of the reflection film may be roughly the same as that of these lines. If the width is too great, the reflection film increases the reflectance on the display surface and hence, decrease in contrast results. So long as the reflection film 30 at least covers the channel part of the semiconductor layer 103, the reflection film may have any width that does not to induce contrast decrease.

Figure 5:
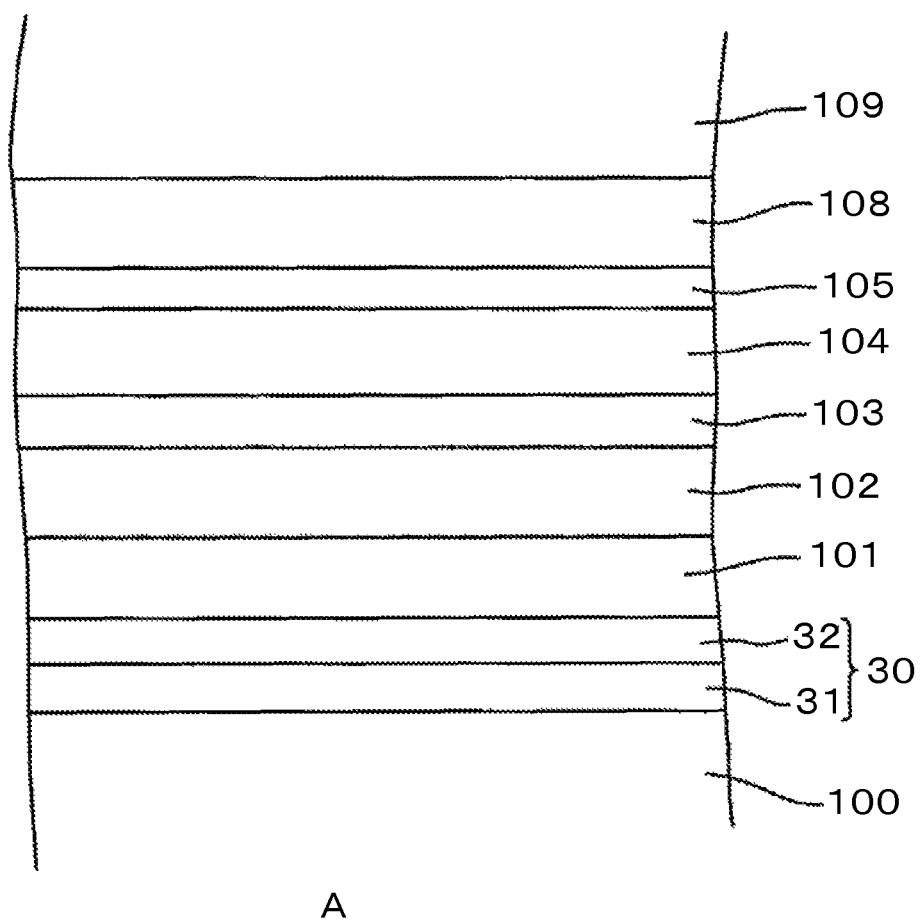
FIG. 5 is a detailed sectional view showing an A area in FIG. 4.

FIG. 5 is an enlarged sectional view of an area 'A' shown in FIG. 4. Referring to FIG. 5, the reflection film 30 is formed on the TFT substrate 100. The reflection film 30 includes a first reflection film 31, and a second reflection film 32 formed thereon. For example, the first reflection film 31 is formed of AlSi, while the second reflection film 32 is formed of MoW. The first reflection film 31 has a thickness of 100 nm, for example, while the second reflection film 32 has a thickness of 50 nm, for example. A reflectance of AlSi is 86.2%, for example, while a reflectance of MoW is 60%, for example. The reflectance in this case is determined by making measurement of light reflected from a metal film formed on the glass substrate 100.

As just described, the reflection film 30 is formed in a double layer structure where the reflectance of the first reflection film 31 on the lower side is greater than that of the second reflection film 32 on the upper side. The structure offers the following advantage in a case where the reflection film 30 is formed wider than the image signal line 20 or the scanning line 10. Specifically, the light reflection to the display surface is suppressed so as to avoid the decrease in contrast by increasing the light reflection from the lower layer 31 to raise the use efficiency of light from the backlight and setting the light reflection from the upper layer 32 smaller than that from the lower layer 31.

The first base film 101 and the second base film 102 are formed on the second reflection film 32 in this order. The semiconductor layer 103, the gate electrode 105, the interlayer insulating film 106, the inorganic passivation film 108 and the organic passivation film 109 are formed on the second base film 102 in the order named. The layers formed on the organic passivation film 109 have been described with reference to FIG. 4 and hence, are not described again. While FIG. 5 illustrates the reflection film of the double layer structure, a single layer structure made of AlSi or the like having a high reflectance can also afford the effect of the invention.

Referring to FIG. 4, the reflection film is divided from each other and the divided reflection films are electrically floating. Thus, the reflection film 30 does not substantially form capacitance jointly with the scanning line 10 or the image signal line 20 or the like and hence, does not adversely affect the signal writing speed and the like. Further, the reflection film 30 reflects the light from the backlight at such a high reflectance that the regeneration rate of this light can also be increased. The embodiment can increase the use efficiency of the light from the backlight without inducing the delay in signal writing.

Second Embodiment

Figure 6:
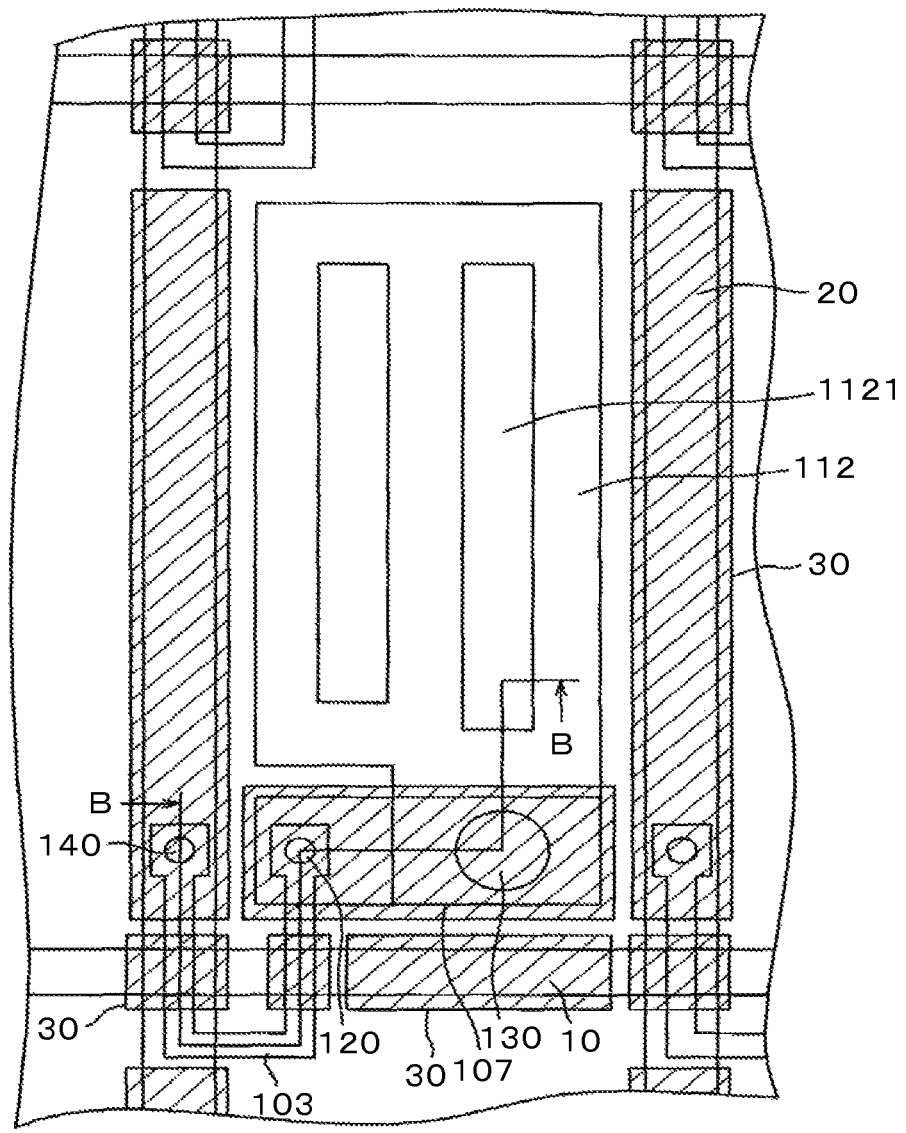
FIG. 6 is a plan view showing a second embodiment of the invention.

FIG. 6 is a plan view showing a second embodiment of the invention. FIG. 6 differs from FIG. 3 in a forming range of the reflection film 30. Referring to FIG. 6, the reflection film 30 is formed under the most part of the image signal line 20, under the scanning line 10, under the channel part of the TFT and under the contact electrode 107. The forming range of the reflection film 30 is increased in FIG. 6, as compared with FIG. 3. However, what is important is that the reflection films 30 are each divided at the respective regions, each of which is electrically floating. This ensures that if the regions of the reflection film 30 are increased, the capacitance caused by the reflection film 30 is not substantially increased and the delay in signal writing and the like can be prevented.

In FIG. 6, the reflection film 30 under the image signal line 20 and the reflection film 30 under the scanning line 10 are divided on a per-pixel basis. Further referring to FIG. 6, the reflection film 30 at the area under the TFT and at the area under image signal line 20 may be divided. Further, the reflection films 30 at the area under the TFT and at the area under the scanning line 10 may be divided. In other words, the reflection film 30 can be divided appropriately in order not to induce the delay in signal writing and the like.

Figure 7:
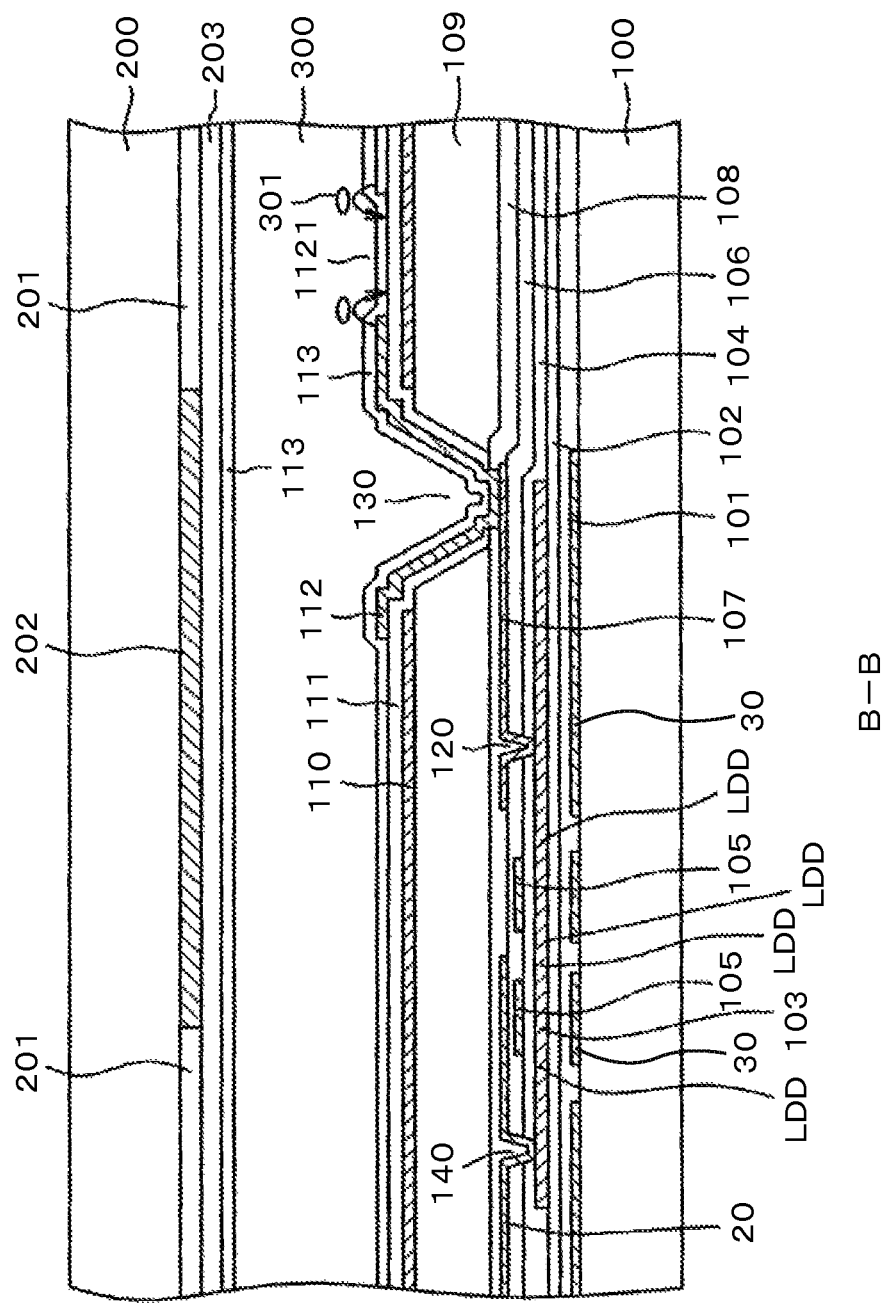
FIG. 7 is a sectional view taken on the line B-B in FIG. 6.

FIG. 7 is a sectional view taken on the line B-B in FIG. 6. FIG. 7 differs from FIG. 4 of the first embodiment only in the forming range of the reflection film 30. Referring to FIG. 7, the reflection film 30 is formed under the most part of the semiconductor layer 103 and under the most part of the image signal line 20. However, the reflection films 30 are divided at the respective areas and the reflection films 30 at the respective areas are electrically floating.

Referring to FIG. 6 and FIG. 7, the reflection film 30 is formed to have a width slightly greater than that of the image signal line 20 or the scanning line 10. However, the width of the reflection film may be roughly the same as that of these lines. If the width is too great, the reflection film increases the reflectance on the display surface and hence, decrease in contrast results. The reflection film 30 must be wide enough to cover at least the channel part of the semiconductor layer 103 of the TFT. However, the reflection film at the other areas may be formed to have such a width as not to decrease the contrast.

A detailed cross-sectional structure including the reflection film 30 is the same as that of the first embodiment described with reference to FIG. 5. The effect achieved by forming the reflection film 30 in the double layer structure and setting the reflectance of the first reflection film 31 on the lower side greater than the reflectance of the second reflection film 32 on the upper side, as described with reference to FIG. 5, is increased in this embodiment in accordance to the increase in the area of the reflection film 30.

As the screen is increased resolution, the ratio of the non-transmission areas such as the wirings and through-holes increases while the ratio of the aperture areas decreases. In the case of a screen having a resolution of 445 ppi (pixel per inch), for example, an aperture ratio is on the order of 50%. When the resolution increases to 525 ppi, the aperture ratio decreased to 30%. Therefore, the effect of the invention becomes more significant as the screen resolution increases.

Figure 8A:
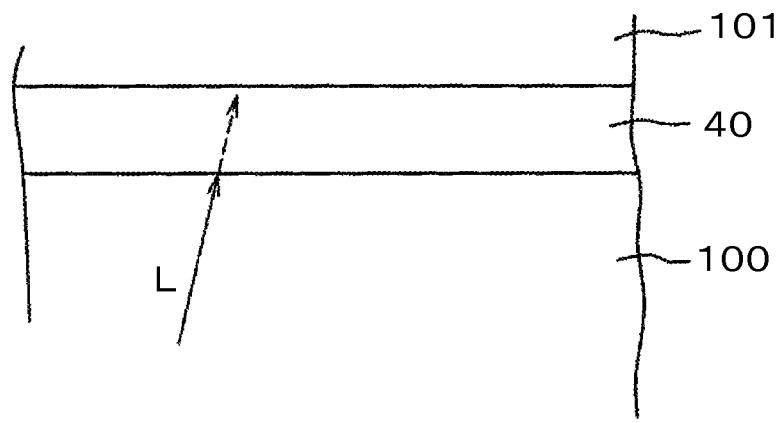
FIG. 8A is a schematic diagram showing an operation when a light shielding film is formed.
Figure 8B:
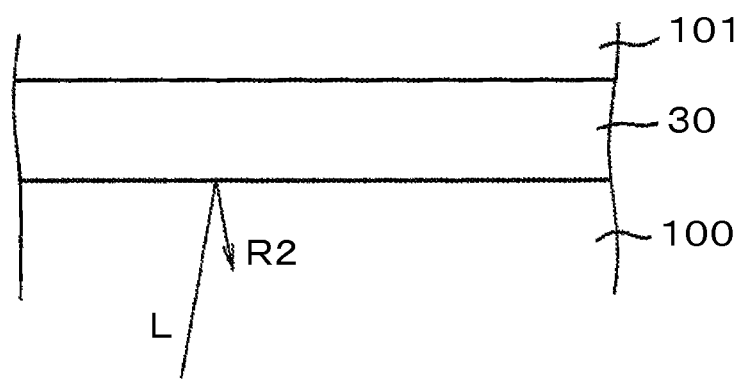
FIG. 8B is a schematic diagram showing an operation when a reflection film is formed.

FIG. 8A to FIG. 10 illustrate how much the brightness is increased by the invention. FIG. 8A is a schematic sectional view showing a state of light from the backlight in a case where a light shielding film 40 is formed on the TFT substrate 100. Referring to FIG. 8A, a light L from the backlight is incident on and absorbed by the light shielding film 40. As shown in FIG. 8B, on the other hand, a light incident on the reflection film 30 behaves as a reflected light R2 to be returned to the backlight where the light is reflected by the backlight again so as to become incident on the transmission area of the TFT substrate 100 and to contribute to the image formation.

FIG. 9 is a table showing how much the brightness is increased by the invention applied the case where the reflection film is formed at the ranges suggested by the second embodiment. In the table, the material of incident plane indicates a material for forming the reflection film 30 at the region shown in FIG. 6 or FIG. 7.

In FIG. 9, the black matrix as the material of incident plane represents a case where a black matrix is formed at the range of the reflection film 30 and is used as the standard. While actual products do not employ the black matrix as the reflection film 30 or the light shielding film 40, the embodiment uses the black matrix as a material that does not form the reflection film. Although the black matrix reflects some light, the black matrix is employed as the standard for evaluation. Incidentally, the reflectance in FIG. 9 and FIG. 10 denotes the reflectance of the lower reflection film, namely the first reflection film 31 in a case where the reflection film 30 is formed of a plurality of layers.

Referring to FIG. 9, the use of Ti having a reflectance of 54.6% for forming the reflection film 30 achieves the brightness increase 1.39 times the brightness achieved by the use of the black matrix. The use of MoW having a reflectance of 60% achieves the brightness increase 1.41 times the brightness achieved by the use of the black matrix. Further, the use of AlSi having a reflectance of 86.2%, as a material of high reflectance, achieves the brightness increase of 1.51 times the brightness achieved by the use of the black matrix.

Figure 10:
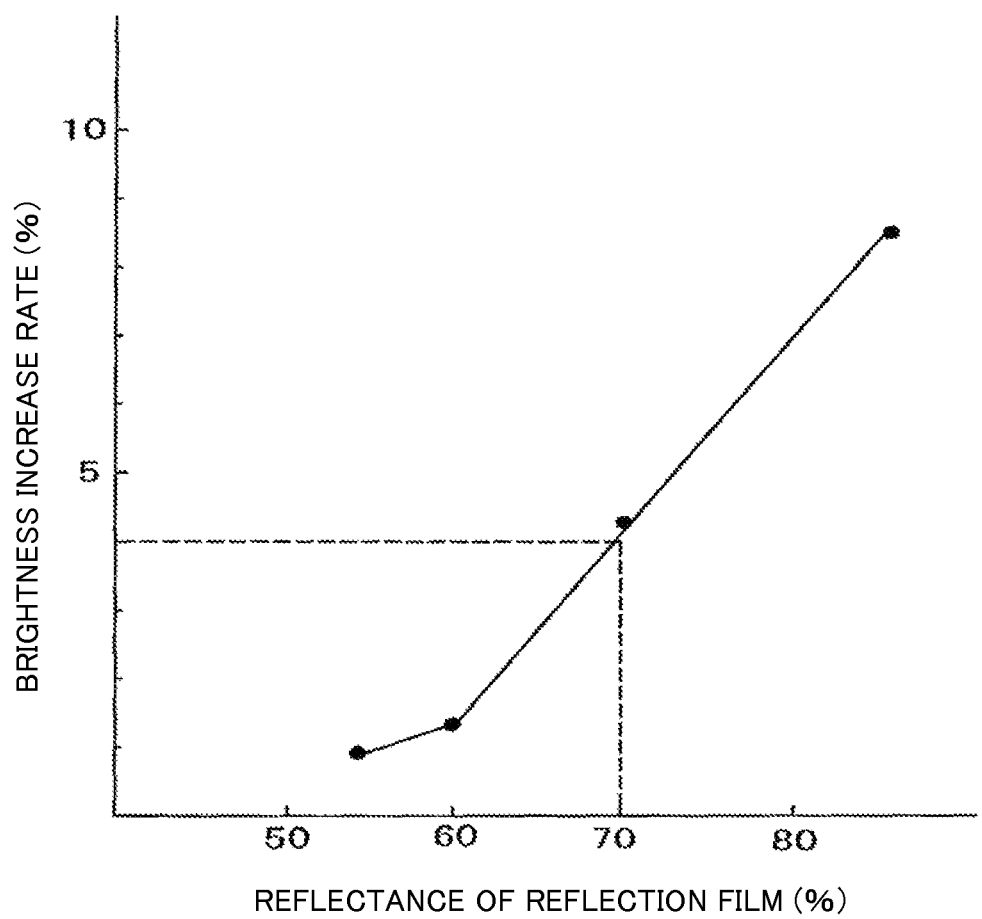
FIG. 10 is a graph showing a relation between the reflectance of the reflection film and the brightness increase.

Even in the case where the reflection film 30 is applied on the regions shown in FIG. 6, the effect varies significantly depending upon the reflectance of the reflection film 30. FIG. 10 is a graph showing a relation between the reflectance of the reflection film 30 and the brightness increase effect. FIG. 10 graphically shows how the brightness increase effect varies according the difference in the reflectance of the reflection film 30 provided that the reflectance of 54.6% equivalent to that of Ti is used as the standard reflectance 1 of the reflection film 30.

Referring to FIG. 10, in a case where the reflection film 30 has a reflectance of 60% equivalent to that of Mow, a brightness increase rate is 1.2 times the brightness increase rate of the reflection film 30 formed of Ti. In a case where the reflection film 30 has a reflectance of 86.2% equivalent to that of AlSi, a brightness increase rate is 8.5 times the brightness increase rate of the reflection film 30 formed of Ti. In a case where the reflection film 30 has a reflectance of 70%, a brightness increase rate is 4 times the brightness increase rate of the reflection film 30 formed of Ti. That is, if the reflection film 30 is formed of a material having a reflectance of 70% or more, an excellent effect can be achieved, namely the brightness increase rate is 4 times or more the brightness increase rate of the reflection film 30 formed of Ti.

According to the embodiment, the reflection film 30 is formed at places under the image signal lines 20 and the scanning lines 10 and under the first base film 101 and hence, the light incident on the TFT substrate 100 is reflected before absorbed by the first base film 101, the second base film 102, the gate insulating film 104, the interlayer insulating film 106 or the like. Accordingly, the embodiment can increase the amount of reflected light.

Third Embodiment

Figure 11:
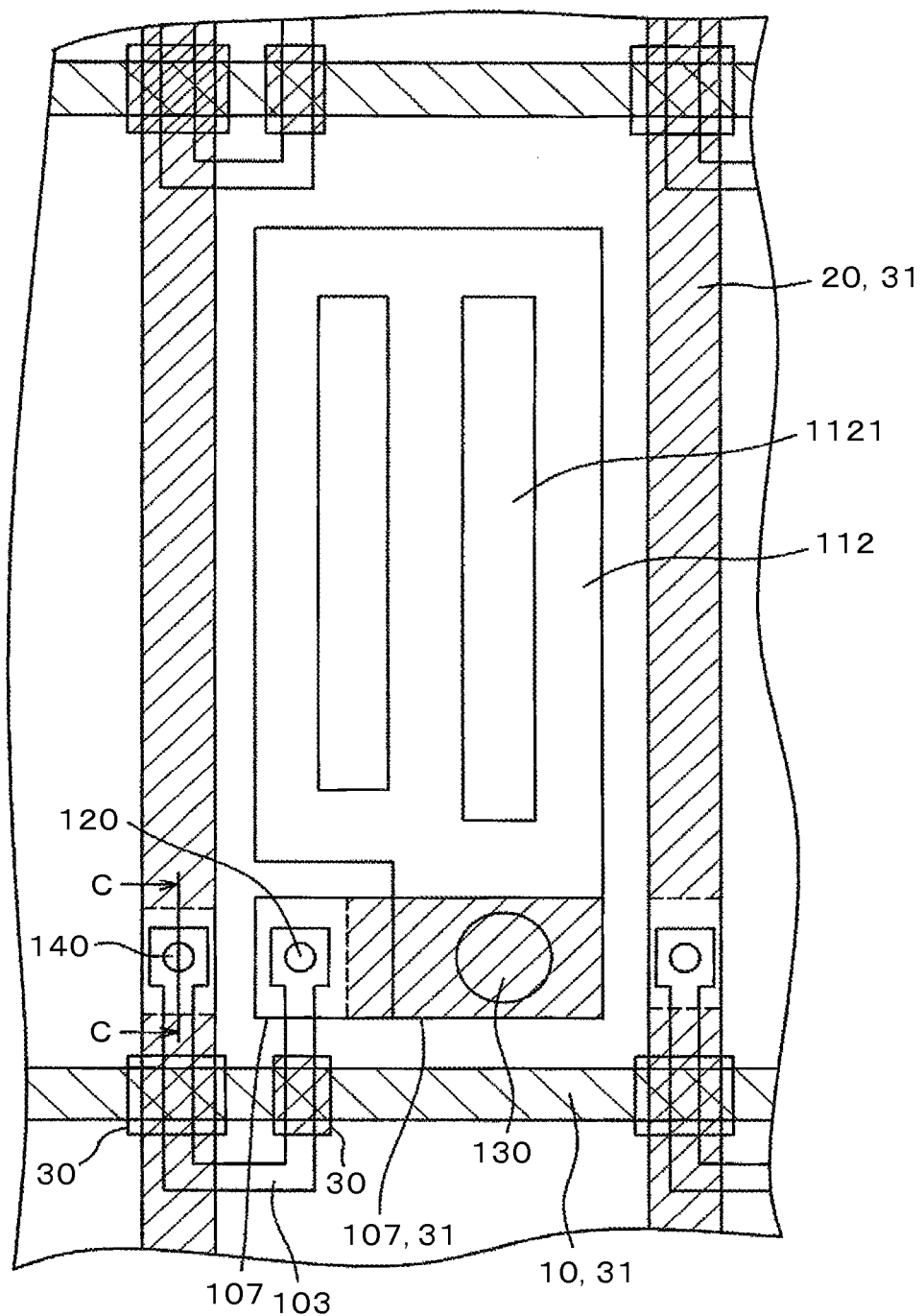
FIG. 11 is a plan view showing a third embodiment of the invention.

FIG. 11 is a plan view showing a third embodiment of the invention. FIG. 11 differs from FIG. 3 of the first embodiment in that the image signal line 20, the scanning line 10 and the contact electrode 107 are formed of wirings including two or more layers and lower sides of the image signal line 20, the scanning line 10 and the contact electrode 107 are formed of an Al alloy, such as AlSi, having high reflectance. This arrangement can increase light reflection from the wirings so as to increase the use efficiency of light from the backlight. As seen in plan view, the reflection film 30 made of AlSi or the like having high reflectance is formed at the area corresponding to the TFT and under the first base film 101, the same way as shown in FIG. 3 of the first embodiment.

However, there is a fear that if Al makes contact with the semiconductor layer 103, Al may be diffused in the semiconductor layer 103 to deteriorate the characteristics of the TFT. According to the embodiment, therefore, an Al alloy is not applied to areas of the through-holes 120, 140 and contact portions at the through-holes 120, 140 are formed of a metal other than Al, such as MoW.

Figure 12:
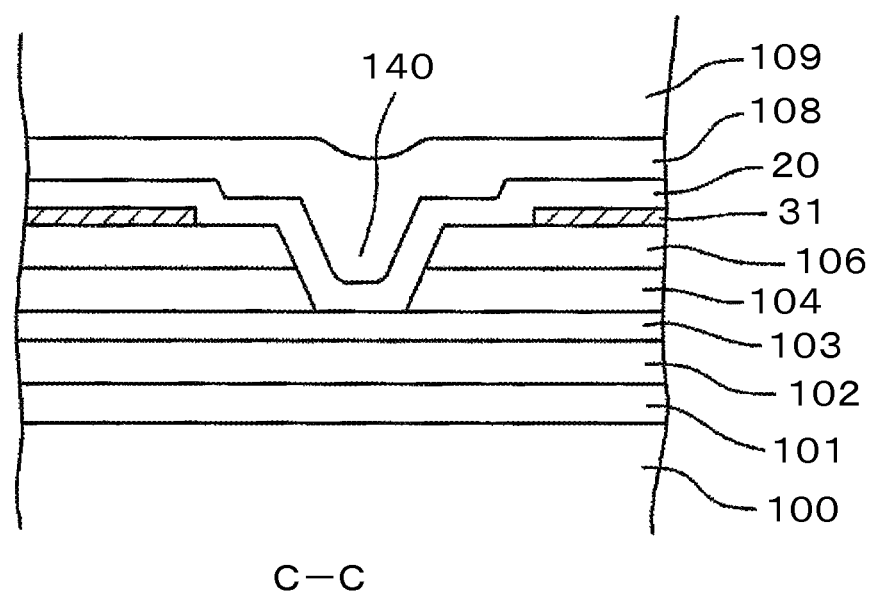
FIG. 12 is a sectional view taken on the line C-C in FIG. 11.

FIG. 12 is a sectional view taken on the line C-C in FIG. 11, showing a cross section of an area of the through-hole 140. As shown in FIG. 12, the image signal line 20 consists of a single layer of MoW at an area where the image signal line 20 makes contact with the semiconductor layer 103 but has a laminate structure of AlSi and MoW at the other area. In this case, an effect to prevent the delay in signal writing and the like is obtained, too because the Al alloy has a low resistivity.

The other components of the this embodiment are the same as those of the first embodiment. In addition to the effect of the first embodiment, this embodiment can achieve an effect to further increase the use efficiency of the backlight because the image signal lines 20 and the scanning lines 10 are increased in the reflectance at the lower sides thereof. This embodiment does not also encounter the substantial increase in the capacitance caused by the reflection film 30 and hence, can obviate the delay in signal writing and the like due to the capacitance increase. In FIG. 11, both the scanning line 10 and the image signal line 20 use the AlSi alloy for forming the under layer thereof. However the effect of the invention can be obtained if only one of the scanning line 10 and the image signal line 20 has such a structure.

While the foregoing description is on the IPS/FFS system, the present invention is also applicable to liquid crystal display devices of other systems such as TN (Twisted Nematic) system and VA (Vertical Alignment) system. While the semiconductor layer is formed of Poly-Si, the invention is also applicable to a case where the semiconductor layer is formed of a-Si. While the Al alloy for forming the reflection film is exemplified by AlSi, examples of other usable Al alloys include AlNb, AlCu and the like.

While FIG. 7 shows the color filter formed on the counter substrate, the invention is also applicable to a case where the color filter is formed on the TFT substrate.

What is claimed is:

1. A liquid crystal display device comprising:
a TFT substrate which includes scanning lines extended in a first direction and arranged in a second direction, image signal lines extended in the second direction and arranged in the first direction, and pixel electrodes formed between the scanning lines and the image signal lines; a counter substrate; and liquid crystal sandwiched between the TFT substrate and the counter substrate,
wherein a semiconductor layer and a gate electrode are laminated via a gate insulating film and a TFT is formed by the semiconductor layer and the gate electrode,
a base film is formed of an insulating film and at an under layer of the semiconductor layer and as seen in plan view, a reflection film is formed on a lower side of the base film at an area corresponding to the TFT,
the reflection film is independently formed for each of the TFTs and each reflection film is electrically floating,
the reflection film has a reflectance of 70% or more at the lower side thereof,
as seen in plan view, the reflection films are also formed at a lower layer of the scanning line and a lower layer of the image signal line,
the reflection films formed at the lower layer of the scanning line and the lower layer of the image signal line are divided for each of the pixels, and
the divided reflection films are electrically floating.

2. The liquid crystal display device according to claim 1, wherein the scanning line or the image signal line has a reflectance of 70% or more at a lower surface thereof.

3. The liquid crystal display device according to claim 2, wherein the reflection film is formed of an Al alloy.

4. The liquid crystal display device according to claim 2, wherein the reflection film is formed of a plurality of layers, the lowest one of which is formed of an Al alloy.

5. The liquid crystal display device according to claim 2, wherein the scanning line or the image signal line is formed of a plurality of layers, the lowest one of which is formed of an Al alloy.

6. The liquid crystal display device according to claim 2, wherein the image signal line is formed of a plurality of layers, the lowest one of which is formed of an Al alloy, and an area where the image signal line is in contact with the semiconductor layer is free from the Al alloy.

7. The liquid crystal display device according to claim 1, wherein the reflection film is formed of an Al alloy.

8. The liquid crystal display device according to claim 1, wherein the Al alloy is AlSi.

9. The liquid crystal display device according to claim 1, wherein the reflection film is formed of a plurality of layers, the lowest one of which is formed of an Al alloy.

10. The liquid crystal display device according to claim 1, wherein the scanning line or the image signal line is formed of a plurality of layers, the lowest one of which is formed of an Al alloy.

11. The liquid crystal display device according to claim 1, wherein the image signal line is formed of a plurality of layers, the lowest one of which is formed of an Al alloy, and an area where the image signal line is in contact with the semiconductor layer is free from the Al alloy.

* * * * *